(12) United States Patent
Ho et al.

(10) Patent No.: US 8,144,844 B1
(45) Date of Patent: *Mar. 27, 2012

(54) METHOD AND SYSTEM FOR ANNOUNCEMENT

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/870,525

(22) Filed: Aug. 27, 2010

Related U.S. Application Data

(63) Continuation of application No. 11/443,901, filed on May 30, 2006, now Pat. No. 7,817,785.

(51) Int. Cl.
*H04M 1/64* (2006.01)
(52) U.S. Cl. .................... 379/88.22; 379/88.25
(58) Field of Classification Search ........... 379/67.1–87; 707/602
See application file for complete search history.

(56) References Cited

U.S. PATENT DOCUMENTS

| | | | |
|---|---|---|---|
| 7,194,516 B2 * | 3/2007 | Giacobbe et al. | 709/206 |
| 7,231,403 B1 * | 6/2007 | Howitt et al. | 1/1 |

* cited by examiner

*Primary Examiner* — Davetta W Goins
*Assistant Examiner* — Mohammad Islam
(74) *Attorney, Agent, or Firm* — North Shore Patents, P.C.; Michele Liu Baillie

(57) ABSTRACT

A method for delivering audio announcements, includes: receiving an announcement package, the announcement package including a package identity, a package update time, and one or more announcement items; and presenting the announcement package to an audio player. Each announcement item includes an item identity, and a summary part, where the summary part includes audio information. The audio information includes an audio data type and audio data. Updates for the announcement package can be received, where the announcement package is modified according to the update. A content of the announcement package can be replaced, deleted, or added. The announcement item can be presented to the audio player once, repeatedly, or periodically. In this manner, audio announcements are delivered in an effective and timely manner.

26 Claims, 6 Drawing Sheets

METHOD AND SYSTEM FOR ANNOUNCEMENT

CROSS-REFERENCE TO RELATED APPLICATIONS

This application is a continuation of co-pending U.S. patent application entitled "Method and System for Announcement", Ser. No. 11/443,901, filed on May 30, 2006.

BACKGROUND OF THE INVENTION

1. Field

This invention relates generally to telecommunications, and more specifically to a system and a method for delivering audio announcement.

2. Related Art

There are many existing methods for delivering audio announcement to a user. In one scenario, a person dials a telephone number at a telephone to connect to a machine and listens to a pre-recorded announcement such as location and business hours of a merchant, road conditions or weather conditions. The machine, from a simple answering machine to a sophisticated Interactive Voice Recorder (IVR), delivers the announcement by sending the audio signals of the announcement to the telephone over a telephony network. For the user to listen to the announcement again, he/she has to dial the telephone number to connect to the machine again. When there is an update for the announcement, an operator records a new announcement in the machine. The user needs to dial in to listen to the announcement.

In a different scenario, a radio broadcasting system delivers an announcement such as world and local news, weather reports, sports updates, and financial news by sending audio signals of the announcement to a radio. To deliver an announcement, a broadcaster reads the announcement or plays a pre-recorded announcement through the radio broadcasting system. To deliver an announcement multiple times, the broadcaster reads or plays the announcement multiple times. When there is an update for an announcement, the broadcaster reads the updated announcement or plays a pre-recorded updated announcement. To deliver a plurality of announcements, a broadcaster repeats the above process for each announcement, whether it is a repeat announcement, an updated announcement, or a new announcement. The broadcaster typically delivers the announcements infrequently or at a mixed time, such as every hour by the hour, 6 times a day, or in the morning and evening hours.

In another scenario, a television broadcasting system delivers an announcement in a similar fashion as a radio broadcasting system.

With the emergence of the Internet, a person uses a Web browser to obtain information, including listening to an announcement over the Internet. To listen to an announcement, a person navigates a web page or multiple web pages, and selects a textual or graphical representation of the announcement. Where there is an update for the announcement, the person needs to navigate a web page or multiple web pages, and selects a textual or graphical presentation of the announcement to listen to the announcement.

The above scenarios illustrate deficiencies in delivering audio announcement to a user in an effectively and timely manner. Therefore, there is a need to improve the effectiveness and timeliness of delivering audio announcement.

BRIEF SUMMARY OF THE INVENTION

A method for delivering audio announcements includes: receiving an announcement package, the announcement package including a package identity, a package update time, and one or more announcement items; and presenting the announcement package to an audio player. Each announcement item includes an item identity, and a summary part, where the summary part includes audio information. The audio information includes an audio data type and audio data. Updates for the announcement package can be received, where the announcement package is modified according to the update. A content of the announcement package can be replaced, deleted, or added. The announcement item can be presented to the audio player once, repeatedly, or periodically. In this manner, audio announcements are delivered in an effective and timely manner.

DETAILED DESCRIPTION OF THE INVENTION

Figure 1:
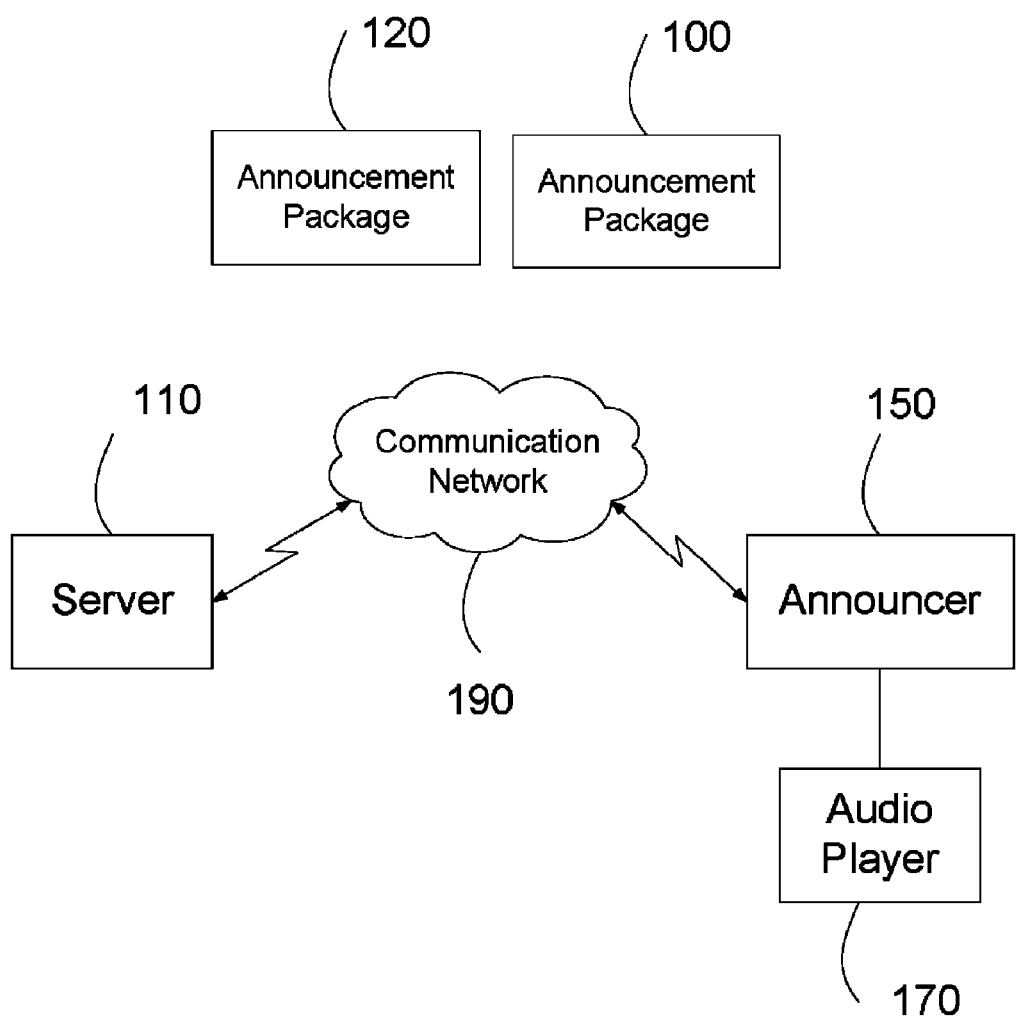
FIG. 1 illustrates a scenario where an announcer receives an announcement package, and presents the announcement package.

FIG. 1 illustrates a scenario where an announcer receives an announcement package, and presents the announcement package.

In one embodiment, an announcement is a world news report, a local news report, a sports score update, or a weather forecast. In one embodiment, an announcement is an astrology or horoscope prediction. In one embodiment, an announcement is a financial report, a stock recommendation, or a mortgage rate summary. In one embodiment, an announcement is a government alert, such as a flood alert, a mountain lion sighting alert, or a child abduction alert. In one embodiment, an announcement is a notification, such as a prescription drug ready notification or a restaurant table ready notification. In one embodiment, an announcement is a personal reminder, such as a dental appointment reminder, a conference meeting reminder, or a physiotherapy session reminder. In one embodiment, an announcement is an advertisement, a commercial promotion, or a product recall alert.

An announcement package 100 includes information for a plurality of announcements. In one embodiment, announcement package 100 includes information for a greeting message.

Announcer 150 receives announcement package 100 from a server 110 over a communication network 190. In one embodiment, communication network 190 includes an Internet Protocol (IP) network. In one embodiment, communication network 190 includes a public network such as the Internet. In one embodiment, communication network 190 includes a private network such as a corporate Virtual Private Network (VPN) or a home network. In one embodiment, communication network 190 includes a wired network such an Ethernet network. In one embodiment, communication network 190 includes a cellular network, such as a General Packet Radio Service (GPRS) network. In one embodiment, communication network 190 includes a wireless local area network (WLAN), such as a WiFi network. In one embodiment, announcer 150 receives announcement package 100 from server 110 using Hypertext Transfer Protocol (HTTP). For example, announcer 150 sends an HTTP GET request to server 110 and receives announcement package 100 in a response for the request. In one embodiment, the entity-body of the response includes announcement package 100. Hypertext Transfer Protocol is described in IETF RFC 2616 "Hypertext Transfer Protocol—HTTP/1.1".

Announcer 150 presents announcement package 100 by presenting the plurality of announcements and the greeting message. In one embodiment, announcer 150 connects to an audio player 170. Announcer 150 presents announcement package 100 by sending information for the plurality of announcements and the greeting message to audio player 170. Audio player 170 converts the information to sound.

In one embodiment, announcer 150 presents announcement package 100 once, repeatedly, or periodically. In one embodiment, announcer 150 presents the plurality of announcement items according to an order. In one embodiment, announcer 150 selects an announcement from the plurality of announcement items for presentation.

In one embodiment, announcer 150 receives an update for announcement package 100. In one embodiment, announcer 150 receives an update for announcement package 100 from server 110. In one embodiment, the update for announcement package 100 is an announcement package 120. Announcer 150 updates announcement package 100 based on announcement package 120. In one embodiment, announcer 150 updates announcement package 100 by modifying information for an announcement in announcement package 100. In one embodiment, announcer 150 updates announcement package 100 by adding information for a new announcement to announcement package 100. In one embodiment, announcer 150 updates announcement package 100 by removing information for an existing announcement from announcement package 100. In one embodiment, announcer 150 updates announcement package 100 by modifying information for the greeting message in announcement package 100. Announcer 150 presents the modified announcement package 100.

Equation 1.01 describes an announcement package. Equation 1.01 and subsequent equations use a syntax similar to Extensible Markup Language (XML) Document Type Declaration (DTD) based on World Wide Web Consortium (W3C) Recommendation "Extensible Markup Language (XML)".

<!ELEMENT announcement package (package identity, package update time, prelude, announcement item+)> (Equation 1.01)

Equation 1.01 describes announcement package. Announcement package includes a package identity, a package update time, a prelude, and one or more announcement items.

Equation 1.02 describes package identity. Equation 1.03 describes package update time. Equation 1.04-1.08 describe ELEMENTs that are included in prelude or announcement item. Equation 1.09-1.10 describe prelude and announcement item respectively.

Equation 1.02 describes package identity.

<!ELEMENT package identity (#PCDATA)> (Equation 1.02)

Package identity is #PCDATA (parsed character data), or a collection of parsed characters.

(Example 1.02a) <package identity>local-weather-report/package identity>
(Example 1.02b) <package identity>World News Tonight 10987</package identity>

In example 1.02a, package identity is "local-weather-report". In example 1.02b, package identity is "World News Tonight 10987".

Equation 1.03 describes package update time.

<!ELEMENT package update time (#PCDATA)> (Equation 1.03)

(Example 1.03a) <package update time>30 minutes</package update time>
(Example 1.03b) <package update time>42 minutes</package update time>

In example 1.03a, package update time is "30 minutes". In example 1.03b, package update time is "42 minutes".

Equation 1.04 describes audio data type.

<!ELEMENT audio data type (#PCDATA)> (Equation 1.04)

Audio data type can have content of "GSM" or "G723".
(Example 1.04a) <audio data type>G723</audio data type>
(Example 1.04b) <audio data type>GSM</audio data type>

In example 1.04a, audio data type is "G723". In example 1.04b, audio data type is "GSM".

Equation 1.05 describes audio data.

<!ELEMENT audio data (#CDATA)> (Equation 1.05)

Audio data is #CDATA (character data) or a collection of non-parsed characters.
(Example 1.05a) <audio data>Breaking news from Orlando, Fla. Hurricane Andrew is in striking distance</audio data>
(Example 1.05b) <audio data>NCAA basketball tournament is underway in Oakland, Calif. Duke is taking on Utah state tonight at 630 pm</audio data>

For illustrative purpose, audio data is presented in textual representation. In example 1.05a, audio data is "Breaking news from Orlando, Fla. Hurricane Andrew is in striking distance". In example 1.05b, audio data is "NCAA basketball tournament is underway in Oakland, Calif. Duke is taking on Utah state tonight at 630 pm".

Equation 1.06 describes audio information.

<!ELEMENT audio information (audio data type, audio data)> (Equation 1.06)

Audio information includes an audio data type and an audio data.
(Example 1.06a) <audio information>
  <audio data type>G723</audio data type>
  <audio data>We are expecting a sunny day in the Bay Area. Day time high is 85 degree. Day time low is 67 degree</audio data>
</audio information>
(Example 1.06b) <audio information>
  <audio data type>GSM</audio data type>
  <audio data>This is it for now. Please stay tuned for an update in 30 minutes</audio data>
</audio information>

In example 1.06a, audio information includes audio data type "G723" and audio data "We are expecting a sunny day in the Bay Area. Day time high is 85 degree. Day time low is 67 degree". In example 1.06b, audio information includes audio data type "GSM" and audio data "This is it for now. Please stay tuned for an update in 30 minutes".

Equation 1.07 describes summary part.

<!ELEMENT summary part (audio information)> (Equation 1.07)

Summary part includes an audio information.
(Example 1.07a) <summary part>
   <audio information>
      <audio data type>G723</audio data type>
      <audio data>We are expecting a sunny day in the Bay Area. Day time high is 85 degree. Day time low is 67 degree</audio data>
   </audio information>
</summary part>
(Example 1.07b) <summary part>
   <audio information>
      <audio data type>G723</audio data type>
      <audio data>Seattle Seahawks just wiped Texas Cowboys 49 to zip</audio data>
   </audio information>
</summary part>
Examples 1.07a-1.07b are examples of summary part.
Equation 1.08 describes item identity.

<!ELEMENT item identity (#PCDATA)>   (Equation 1.08)

(Example 1.08a) <item identity>Wimbledon-men-singles</item identity>
(Example 1.08b) <item identity>News-Item-108</item identity>
In example 1.08a, item identity is "Wimbledon-men-singles". In example 1.08b, item identity is "News-Item-108".
Equation 1.09 describes prelude.

<!ELEMENT prelude (audio information)>   (Equation 1.09)

Prelude includes an audio information.
(Example 1.09a) <prelude>
   <audio information>
      <audio data type>G723</audio data type>
      <audio data>Good morning. This is Jul. 22, 2005. I am Jason Brown for Hummingbird News Service. I will be bringing you breaking news from the country and around the world, plus local weather report</audio data>
   </audio information>
</prelude>
(Example 1.09b) <prelude>
   <audio information>
      <audio data type>GSM</audio data type>
      <audio data>Good afternoon. This is Jul. 22, 2005. I am Terry Huffman reporting for Hummingbird News Service</audio data>
   </audio information>
</prelude>
Examples 1.09a-1.09b are examples of prelude.
Equation 1.10 describes announcement item.

<!ELEMENT announcement item (item identity, summary part)>   (Equation 1.10)

Announcement item includes an item identity and a summary part.
(Example 1.10a) <announcement item>
   <item identity>Weather-Bay Area</item identity>
   <summary part>
      <audio information>
         <audio data type>G723</audio data type>
         <audio data>We are expecting a sunny day in the Bay Area. Day time high is 85 degree. Day time low is 67 degree</audio data>
      </audio information>
   </summary part>
</announcement item>
(Example 1.10b) <announcement item>
   <item identity>NFL-Update-2133</item identity>
   <summary part>
      <audio information>
         <audio data type>G723</audio data type>
         <audio data>Seattle Seahawks just wiped Texas Cowboys 49 to zip</audio data>
      </audio information>
   </summary part>
</announcement item>
In example 1.10a, announcement item includes item identity "Weather-Bay Area" and a summary part. In example 1.10b, announcement item includes item identity "NFL-Update-2133" and a summary part.

Example 1.11 illustrates an announcement package in the format according to Equation 1.01 to 1.10.
(Example 1.11)

| | |
|---|---|
| (Line 101) | <announcement package> |
| (Line 102) |   <package identity>News Report 1039</package identity> |
| (Line 103) |   <package update time>30 minutes</package update time> |
| (Line 104) |   <prelude> |
| (Line 105) |     <audio information> |
| (Line 106) |       <audio data type>G723</audio data type> |
| (Line 107) |       <audio data>Good morning. This is July 22, 2005. |
| (Line 108) |       I am Jason Brown for Hummingbird News Service. |
| (Line 109) |       I will be bringing you breaking news from the |
| (Line 110) |       country and around the world, plus local weather |
| (Line 111) |       report</audio data> |
| (Line 112) |     </audio information> |
| (Line 113) |   </prelude> |
| (Line 114) |   <announcement item> |
| (Line 115) |     <item identity>Weather-Bay Area</item identity> |
| (Line 116) |     <summary part> |
| (Line 117) |       <audio information> |
| (Line 118) |         <audio data type>G723</audio data type> |
| (Line 119) |         <audio data>We are expecting a sunny day in the |
| (Line 120) |         Bay Area. Day time high is 85 degree. Day time |
| (Line 121) |         low is 67 degree</audio data> |
| (Line 122) |       </audio information> |
| (Line 123) |     </summary part> |
| (Line 124) |   </announcement item> |
| (Line 125) |   <announcement item> |
| (Line 126) |     <item identity>News-Item-102</item identity> |
| (Line 127) |     <summary part> |
| (Line 128) |       <audio information> |
| (Line 129) |         <audio data type>GSM</audio data type> |
| (Line 130) |         <audio data>NASA announces today they it will try |
| (Line 131) |         for three shuttle flights this year if the space agency |
| (Line 132) |         is able to launch Discovery in May or July |
| (Line 133) |         </audio data> |
| (Line 134) |       </audio information> |
| (Line 135) |     </summary part> |
| (Line 136) |   </announcement item> |
| (Line 137) | </announcement package> |

The announcement package is illustrated in line 101-137 in example 1.11. The announcement package includes a package identity, a package update time, a prelude, and two announcement items.

Figure 2:
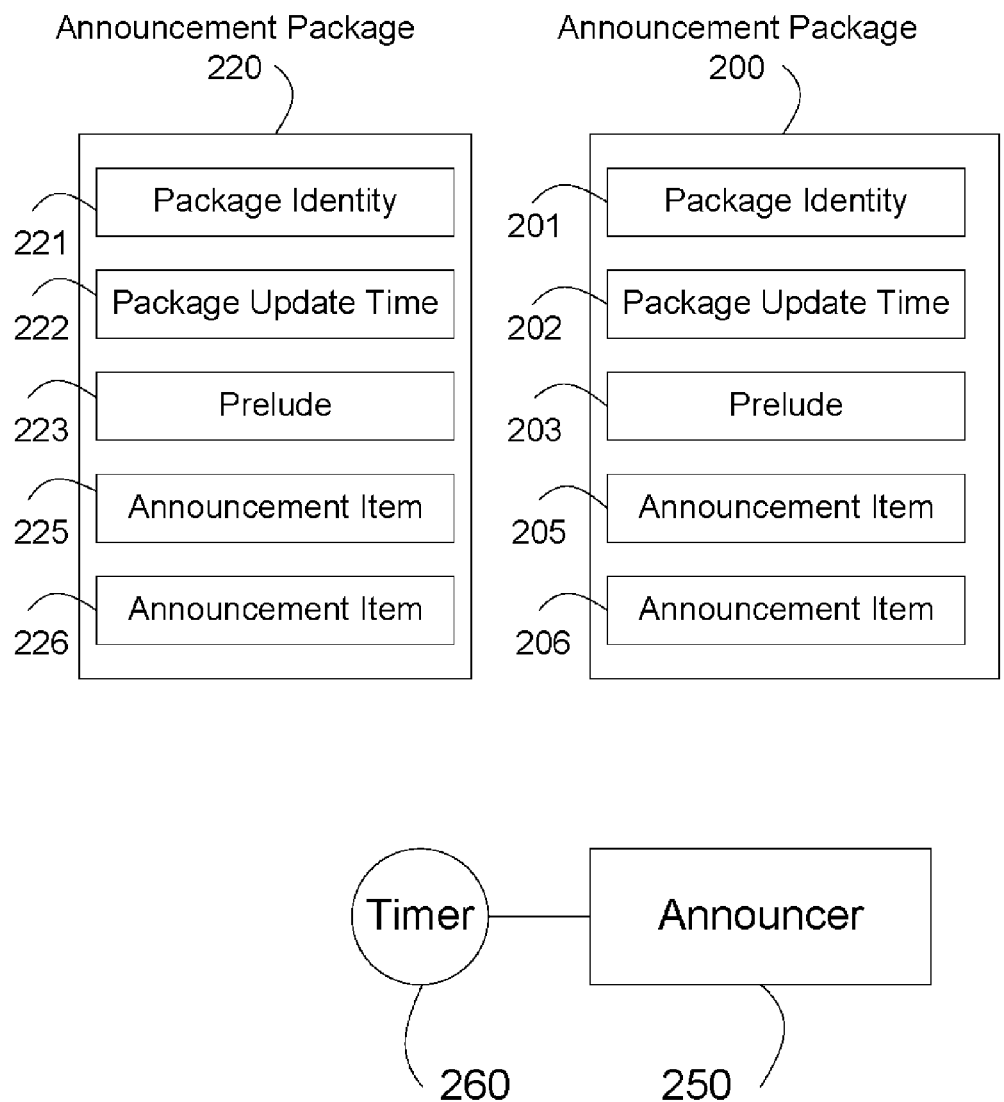
FIG. 2 illustrates a process of announcer to update an announcement package.

The package identity is illustrated in line 102
The package update time is illustrated in line 103.
The prelude is illustrated in line 104-113.
A first announcement item is illustrated in line 114-124.
A second announcement item is illustrated in line 125-136.
FIG. 2 illustrates a process for announcer to update an announcement package.

Announcer 250 receives an announcement package 200 as illustrated in FIG. 1. Announcement package 200 includes a package identity 201, a package update time 202, a prelude 203, and announcement items 205 and 206.

Announcement package 200 is illustrated as,

| | |
|---|---|
| (Line 201) | <announcement package> |
| (Line 202) |   <package identity>News Report 1039</package identity> |
| (Line 203) |   <package update time>28 minutes</package update time> |
| (Line 204) |   <prelude> |
| (Line 205) |     <audio information> |
| (Line 206) |       <audio data type>G723</audio data type> |
| (Line 207) |       <audio data>Good morning. This is Jul. 22, 2005. |
| (Line 208) |       I am Jason Brown for Hummingbird News Service. |
| (Line 209) |       I will be bringing you breaking news from the |
| (Line 210) |       country and around the world, plus local weather |
| (Line 211) |       report</audio data> |
| (Line 212) |     </audio information> |
| (Line 213) |   </prelude> |
| (Line 214) |   <announcement item> |
| (Line 215) |     <item identity>SportsUpdate 10324</item identity> |
| (Line 216) |     <summary part> |
| (Line 217) |       <audio information> |
| (Line 218) |         <audio data type>GSM</audio data type> |
| (Line 219) |       <audio data>NCAA basketball update. Duke is |
| (Line 220) |       leading Texas State by a score of 56 to 14 in the |
| (Line 221) |       waning minutes of the first half</audio data> |
| (Line 222) |       </audio information> |
| (Line 223) |     </summary part> |
| (Line 224) |   </announcement item> |
| (Line 225) |   <announcement item> |
| (Line 226) |     <item identity>News-Item-102</item identity> |
| (Line 227) |     <summary part> |
| (Line 228) |       <audio information> |
| (Line 229) |         <audio data type>GSM</audio data type> |
| (Line 230) |         <audio data>NASA announces today they it will try |
| (Line 231) |       for three shuttle flights this year if the space agency |
| (Line 232) |       is able to launch Discovery in May or July. |
| (Line 233) |       </audio data> |
| (Line 234) |       </audio information> |
| (Line 235) |     </summary part> |
| (Line 236) |   </announcement item> |
| (Line 237) | </announcement package> |

Package identity 201 is illustrated in line 202. Package update time 202 is illustrated in Line 203. Prelude 203 is illustrated in line 204-213. Announcement item 205 is illustrated in line 214-224. Announcement item 206 is illustrated in line 225-236.

Announcer 250 connects to a timer 260. Announcer 250 sets timer 260 based on package update time 202. In this embodiment, package update time is "28 minutes". Announcer 250 sets timer 260 to 28 minutes.

When timer 260 expires. Announcer 250 receives an announcement package 220. Announcement package 220 is an update for announcement package 200.

Announcement package 220 includes package identity 221, package update time 222, prelude 223, and announcement items 225 and 226.

Announcement package 220 is illustrated as,

| | |
|---|---|
| (Line 301) | <announcement package> |
| (Line 302) |   <package identity>News Report 1039</package identity> |
| (Line 303) |   <package update time>17 minutes</package update time> |
| (Line 304) |   <prelude> |
| (Line 305) |     <audio information> |
| (Line 306) |       <audio data type>GSM</audio data type> |
| (Line 307) |       <audio data>Good afternoon. This is July 22, 2005. I am |
| (Line 308) |       Terry Huffman reporting for Hummingbird News |
| (Line 309) |       Service</audio data> |
| (Line 310) |     </audio information> |
| (Line 311) |   </prelude> |
| (Line 312) |   <announcement item> |
| (Line 313) |     <item identity>SportsUpdate 10324</item identity> |
| (Line 314) |     <summary part> |
| (Line 315) |       <audio information> |
| (Line 316) |         <audio data type>G723</audio data type> |
| (Line 317) |         <audio data>NCAA basketball update. Duke is |
| (Line 318) |       widening the lead over Texas State to 74 to 23 at |
| (Line 319) |       the half way mark of the second half</audio data> |
| (Line 320) |       </audio information> |
| (Line 321) |     </summary part> |
| (Line 322) |   </announcement item> |
| (Line 323) |   <announcement item> |
| (Line 324) |     <item identity>News-Item-253</item identity> |
| (Line 325) |     <summary part> |
| (Line 326) |       <audio information> |
| (Line 327) |         <audio data type>G723</audio data type> |
| (Line 328) |         <audio data>The flood level at the Russian river has |
| (Line 329) |       risen to dangerous level</audio data> |
| (Line 330) |       </audio information> |
| (Line 331) |     </summary part> |
| (Line 332) |   </announcement item> |
| (Line 333) | </announcement package> |

Package identity 221 is illustrated in line 302. Package update time 222 is illustrated in line 303. Prelude 223 is illustrated in line 304-311. Announcement item 225 is illustrated in line 312-322. Announcement item 226 is illustrated in line 323-332.

Package identity 201 is "News Report 1039" and package identity 221 is "News Report 1039". Announcer 250 determines that package identity 221 matches package identity 201; announcer 250 updates announcement package 200 based on announcement package 220.

Announcer 250 modifies package update time 202 by replacing the content of package update time 202 with the content of package update time 222.

Announcer 250 modifies prelude 203 by replacing the content of prelude 203 with the content of prelude 223.

Announcer 250 matches the item identity of announcement item 225 with the item identity of announcement items 205 and 206. Announcer 250 determines that the item identity of announcement item 225 "SportsUpdate 10324" matches the item identity of announcement item 205 "SportsUpdate 10324". Announcer 250 replaces the content of announcement item 205 with the content of announcement item 225.

Announcer 250 matches the item identity of announcement item 226 with the item identity of announcement items 205 and 206. Announcer 250 determines that the item identity of the announcement item 226 "News-Item-253" does not match the item identity of announcement items 205 and 206. Announcer 250 adds announcement item 226 to announcement package 200.

After the update, announcement package 200 becomes,

| | |
|---|---|
| (Line 401) | <announcement package> |
| (Line 402) |   <package identity>News Report 1039</package identity> |
| (Line 403) |   <package update time>17 minutes</package update time> |
| (Line 404) |   <prelude> |
| (Line 405) |     <audio information> |
| (Line 406) |       <audio data type>GSM</audio data type> |
| (Line 407) |       <audio data>Good afternoon. This is July 22, 2005. I am |
| (Line 408) |       Terry Huffman reporting for Hummingbird News |
| (Line 409) |       Service</audio data> |
| (Line 410) |     </audio information> |
| (Line 411) |   </prelude> |
| (Line 412) |   <announcement item> |
| (Line 413) |     <item identity>SportsUpdate 10324</item identity> |
| (Line 414) |     <summary part> |
| (Line 415) |       <audio information> |
| (Line 416) |         <audio data type>G723</audio data type> |
| (Line 417) |         <audio data>NCAA basketball update. Duke is |

-continued

```
(Line 418)            widening the lead over Texas State to 74 to 23 at
(Line 419)            the half way mark of the second half</audio data>
(Line 420)          </audio information>
(Line 421)        </summary part>
(Line 422)      </announcement item>
(Line 423)      <announcement item>
(Line 424)        <item identity>News-Item-102</item identity>
(Line 425)        <summary part>
(Line 426)          <audio information>
(Line 427)            <audio data type>GSM</audio data type>
(Line 428)            <audio data>NASA announces today they it will try
(Line 429)            for three shuttle flights this year if the space agency
(Line 430)            is able to launch Discovery in May or July.
(Line 431)            </audio data>
(Line 432)          </audio information>
(Line 433)        </summary part>
(Line 434)      </announcement item>
(Line 435)      <announcement item>
(Line 436)        <item identity>News-Item-253</item identity>
(Line 437)        <summary part>
(Line 438)          <audio information>
(Line 439)            <audio data type>G723</audio data type>
(Line 440)            <audio data>The flood level at the Russian river has
(Line 441)            risen to dangerous level</audio data>
(Line 442)          </audio information>
(Line 443)        </summary part>
(Line 444)      </announcement item>
(Line 445) </announcement package>
```

In the updated announcement package 200, package identity 201 is illustrated in line 402; package update time 202 is illustrated in line 403. Prelude 203 is illustrated in line 404-411. Announcement item 205 is illustrated in Line 412-422. Announcement item 206 is illustrated in Line 423-434. The added announcement item is illustrated in Line 435-444.

Announcer 250 sets timer 260 based on package update time 202 "17 minutes" in the updated announcement package 200, as illustrated earlier in FIG. 2. When timer 260 expires, announcer 250 repeats the process in FIG. 2 to update the updated announcement package 200.

Figure 3:
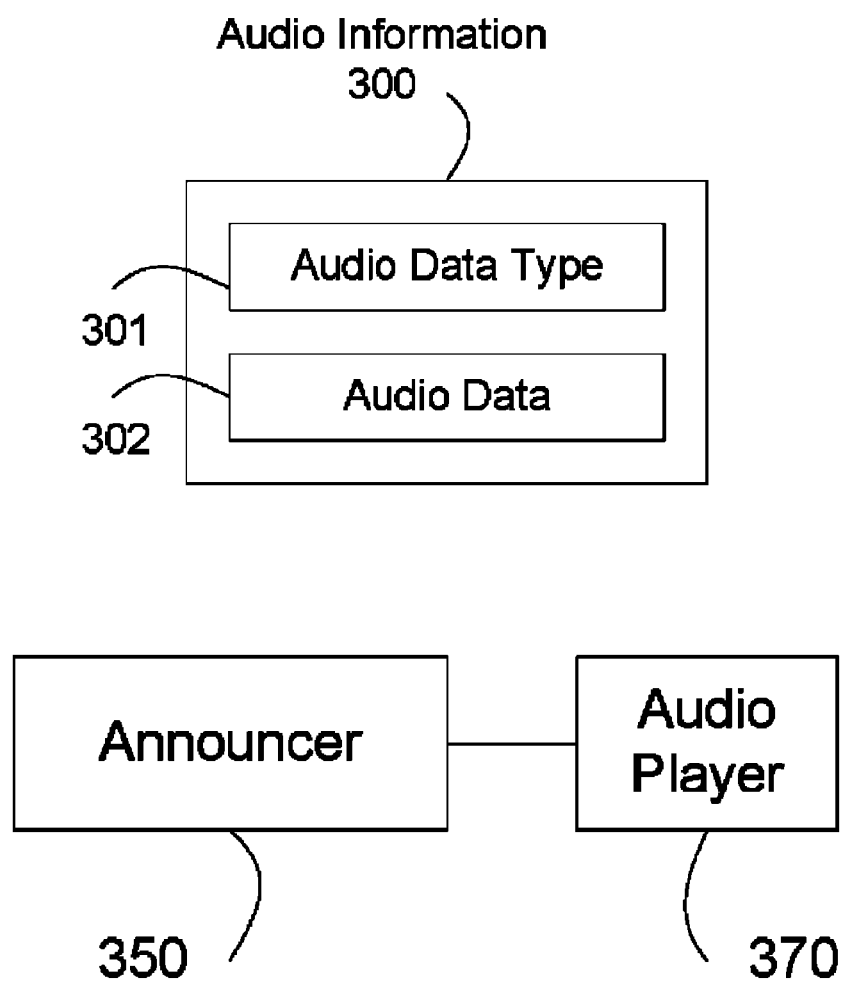
FIG. 3 illustrates a process for announcer to present an audio information.

FIG. 3 illustrates a process for announcer to present an audio information.

Announcer 350 connects to audio player 370. In one embodiment, audio player 370 accepts G723 speech codec format.

Audio information 300 includes audio type 301 and audio data 302. In one embodiment, audio data type 301 is "G723", matching the audio format accepted by audio player 370. Announcer 350 presents audio information 300 by sending audio data 302 to audio player 370. Audio player 370 converts audio data 302 into sound.

In one embodiment, audio data type 301 is "GSM". Announcer 350 presents audio information 300 by converting audio data 302 from GSM speech codec format to G723 speech codec format; and by sending the result of the conversion to audio player 370.

Figure 4:
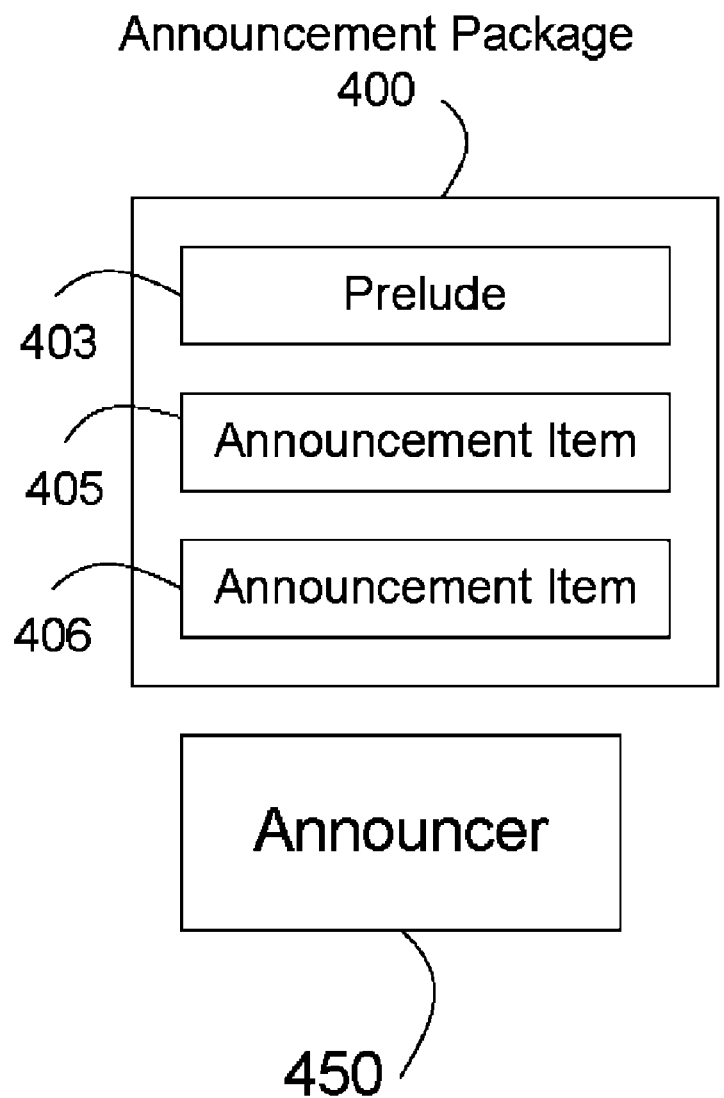
FIG. 4 illustrates a process for announcer to present an announcement package.

FIG. 4 illustrates a process for announcer to present an announcement package.

Announcement package 400 includes a prelude 403 and announcement items 405 and 406.

Announcer 450 presents announcement package 400 by presenting prelude 403, and the plurality of announcement items 405 and 406. Announcer 450 presents prelude 403 by presenting the audio information in prelude 403. Announcer 450 presents an announcement item 405 by presenting the audio information in the summary part of the announcement item 405. Announcer 450 presents an announcement item 406 by presenting the audio information in the summary part of the announcement item 406.

In one embodiment, announcer 450 presents announcement package 400 once. In another embodiment, announcer 450 presents announcement package repeatedly. In one embodiment, announcer 450 presents announcement package 400 periodically, such as every 10 minutes, every 12 minutes, or every hour at the half hour.

Figure 5:
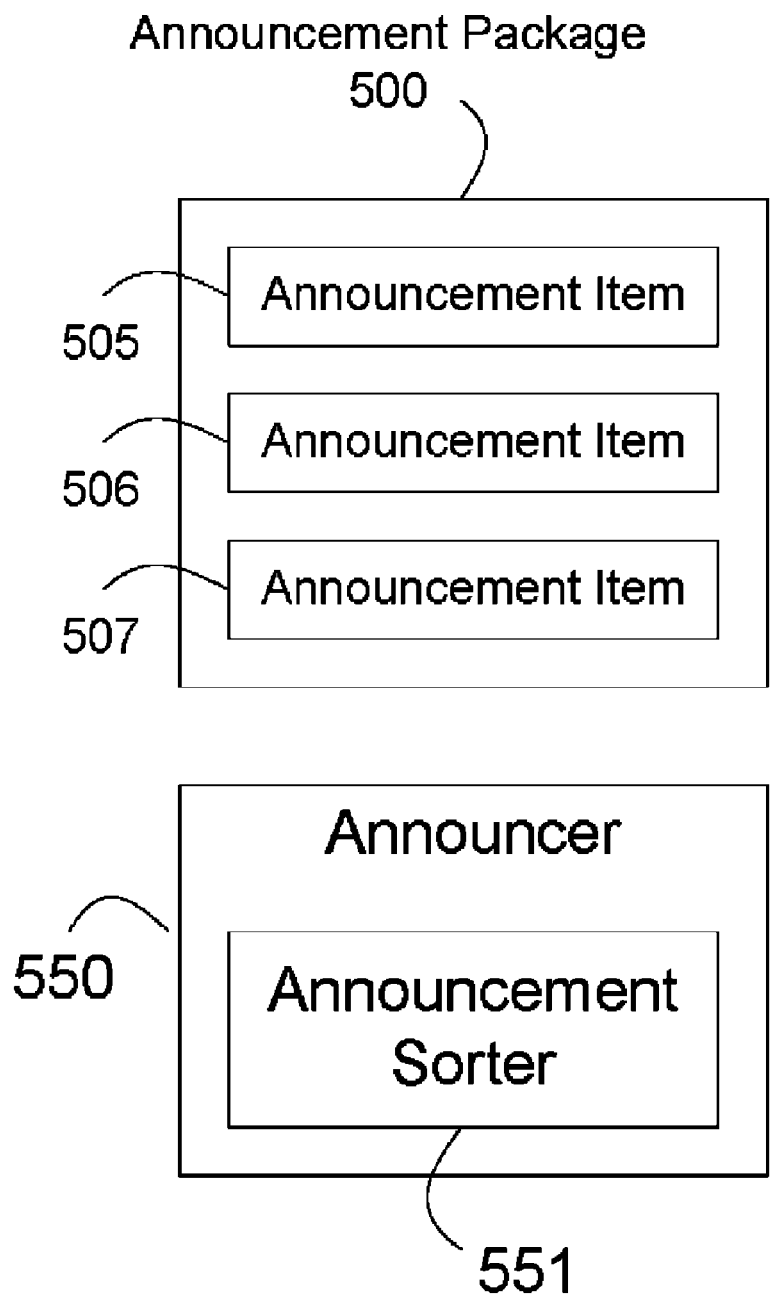
FIG. 5 illustrates a process for announcer to determine an order for the plurality of announcement items in an announcement package.

FIG. 5 illustrates a process for announcer to determine an order for the plurality of announcement items in an announcement package.

Announcement Package 500 includes announcement items 505, 506 and 507.

Announcer 550 includes an announcement sorter 551. Announcement sorted 551 determines an order for announcement items 505, 506 and 507.

In one embodiment, announcement sorter 551 determines an order based on time information. In one embodiment, the time information is a receiving time of an announcement item. In one embodiment, the receiving time of an announcement item is based on the time when announcer 550 first receives an announcement package that includes the announcement item.

In an example, the receiving time of announcement item 505 is "Mar. 3, 2005, 11:53 pm"; the receiving time of announcement item 506 is "Mar. 3, 2005, 11:49 pm"; and the receiving time of announcement item 507 is "March 5, 12.02 am". Announcement sorter 551 determines the order as announcement item 507, 505, and 506.

In one embodiment, the time information is a publication time of an announcement item. In one embodiment, an announcement item includes an item publication time.

Equation 2.01 describes item publication time. Example 2.01a is an example of item publication time. Example 2.01b is an example of an announcement item with item publication time.

```
<!ELEMENT item publication time (#PCDATA)>    (Equation 2.01)
(Example 2.01a) <item publication time>10:45 am, Jul. 20, 2005
    </item publication time>
(Example 2.01b) <announcement item>
    <item identity>SportsUpdate 10324</item identity>
    <item publication time>10:45 am, Jul. 20, 2005
    </item publication time>
    <summary part>
        <audio information>
            <audio data type>G723</audio data type>
            <audio data>NCAA basketball update. Duke is wid-
                ening the lead over Texas State to 74 to 23 at the half
                way mark of the second half</audio data>
        </audio information>
    </summary part>
</announcement item>
```

Announcement sorter 551 determines an order for announcement items 505, 506 and 507 based on item publication time.

In an example, Item publication time in announcement item 505 is "9:32 am Jul. 5, 2005"; item publication time in announcement item 506 is "10:22 am Jul. 5, 2005"; and item publication time in announcement item 507 is "6:19 am Jul. 5, 2005". Announcement sorter 551 determines the order as announcement item 506, 505, and 507.

Figure 6:
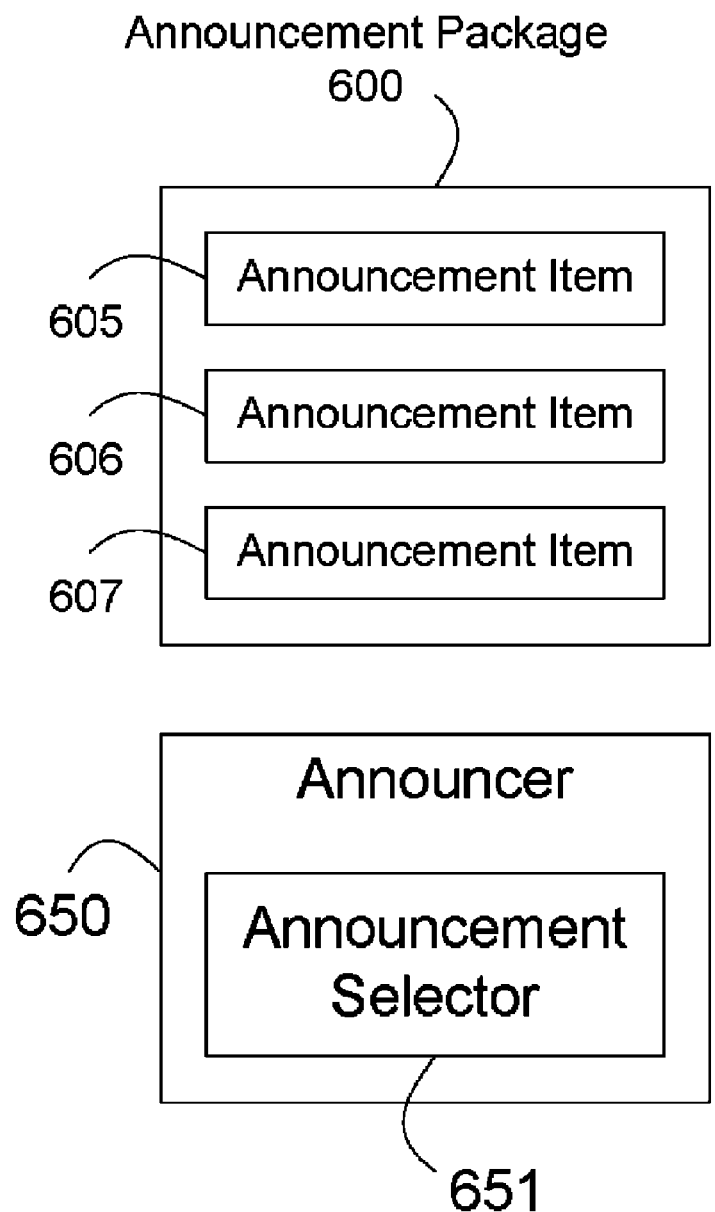
FIG. 6 illustrates a process for announcer to select an announcement item from a plurality of announcement items in an announcement package.

FIG. 6 illustrates a process for announcer to select an announcement item from a plurality of announcement items in an announcement package.

Announcement Package 600 includes announcement items 605, 606 and 607.

Announcer 650 includes an announcement selector 651. Announcement selector 651 selects an announcement item from announcement items 605, 606 and 607.

In one embodiment, announcement selector 651 selects an announcement item based on receiving time of the announcement item. In one embodiment, announcement selector 651 selects an announcement item with a receiving time that is less than a time duration prior to the current time of day.

In one embodiment, the receiving time of announcement item 605 is "Mar. 3, 2005, 11:53 pm"; the receiving time of announcement item 606 is "Mar. 3, 2005, 11:22 pm"; and the receiving time of announcement item 607 is "Mar. 4, 2005, 12:02 am". In one embodiment, the time duration is 1 hour, and the current time of day is "March 4, 1.00 am". Announcement selector 651 determines that the receiving times for announcement 607 is less than 1 hour prior to the current time of day; announcement selector 651 selects announcement items 607.

In one embodiment, audio data does not include directly the data suitable for sound conversion. In one embodiment, an audio data type has a content of "WEB ADDRESS". Audio information includes an audio data location. Audio data location has a content indicating a WEB URL where additional audio data can be obtained.

Equation 3 describes audio data location. Example 3a and 3b are examples of audio data location. Example 3c is an example of an audio information that includes an audio data type "WEB ADDRESS" and an audio data location "http://www.sportcaster.com/NCAA".

<!ELEMENT audio data location (#PCDATA)> (Equation 3)

(Example 3a) <audio data location>http://www.abc.com/news2045
</audio data location>
(Example 3b) <audio data location>http://www.sportcaster.com/NCAA
</audio data location>
(Example 3c) <audio information>
  <audio data type>WEB ADDRESS</audio data type>
  <audio data location>http://www.sportcaster.com/NCAA
  </audio data location>
  <audio data></audio data>
</audio information>

In one embodiment, announcement sorter determines the order of the plurality of announcement items in an announcement package based on other information, such as announcement item priority, or a announcement item type.

In one embodiment, announcement selector selects an announcement item from the plurality of announcement items based on other information, such as item publication time, announcement priority or announcement item type.

In one embodiment, an announcement item includes a title part. Title part includes an audio information. In one embodiment, announcer presents an announcement item by presenting the audio information in the title part before presenting the audio information in the summary part. In one embodiment, announcer presents the audio information in the title part more frequently than audio information in the summary part.

In one embodiment, an announcement package includes a postlude. A postlude includes audio information for a concluding message. In one embodiment, announcer presents postlude after presenting the plurality of announcement items.

In one embodiment, an announcement package is for local news, national news, corporate news, traffic report, weather report, sports update, governmental information, or financial report. In one embodiment, an announcement is for a state news item, a national news item or a world news item. In one embodiment, an announcement is for a local weather report, a national weather report, or a road conditions for local freeways. In one embodiment, an announcement is for a snow condition update for a ski resort, or a sports update. In one embodiment, an announcement is for a financial briefing, a stock quote, or a mortgage rate forecast. In one embodiment, an announcement is for a schedule update of a business conference, or a personal appointment reminder. In one embodiment, an announcement is for an advertisement, a product or service promotion.

In one embodiment, an announcement package is for top-10 popular songs. An announcement is for a song. In one embodiment, announcer receives an update for the announcement package once a week, twice a week, or every other day. Announcer updates the announcement package by adding or removing a song. In one embodiment, announcer determines the order of the songs for presentation. In one embodiment, announcer selects a song for presentation.

In one embodiment, an announcement package is for audio syndicated columns. An announcement is for an audio syndicated column. In one embodiment, an announcement package is for audio book reviews, audio interviews, such as political, cultural, or spiritual interviews. In one embodiment, an announcement package is for weekly city council meetings. In one embodiment, an announcement package is for religious sermons.

In one embodiment, an announcer can be included in a telephone. In one embodiment, the telephone includes a graphical display screen and an announcement package includes information for audio-video announcements. The telephone presents the announcement package by sending audio signals to the telephone speaker, and video signals to the graphical display screen.

In one embodiment, an announcer can be included in a personal computer, a personal data assistance (PDA), a smart-phone or a television.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for receiving an announcement by a telephone, comprising:
(a) receiving a first announcement item by the telephone, the first announcement item comprising a first item identity, a first item time information, and a first audio data;
(b) receiving a second announcement item by the telephone, the second announcement item comprising a second item identity, a second item time information, and a second audio data;
(c) determining by the telephone if the second item identity matches the first item identity; and
(d) in response to determining that the second item identity matches the first item identity, updating the first announcement item by the telephone, the updating comprising:

(d1) updating the first item time information with the second item time information; and
(d2) updating the first audio data with the second audio data.

2. The method of claim 1, wherein the first announcement item or the second announcement item comprises one or more of the following:
   a piece of news;
   an advertisement;
   a sports report;
   a traffic report;
   a weather report; or
   an event reminder.

3. The method of claim 1, wherein the updating (d) further comprises:
   (d3) in response to determining that the second item identity does not match the first item identity, adding by the telephone a new announcement item comprising the second item identity, the second item time information, and the second audio data.

4. The method of claim 3, further comprising:
   (e) sending by the telephone the first audio data of the first announcement item and the second audio data of the new announcement item to an audio player.

5. The method of claim 4, wherein the sending (e) comprises:
   (e1) determining by the telephone an order for the first audio data and the second audio data; and
   (e2) sending by the telephone the first audio data and the second audio data to the audio player according to the order.

6. The method of claim 5, wherein the determining (e1) comprises:
   (e1i) determining the order based on the first item time information and the second item time information.

7. The method of claim 5, wherein the first announcement item further comprises a first item priority and the second announcement item further comprises a second item priority, wherein the determining (e1) comprises:
   (e1i) determining the order based on the first item priority and the second item priority.

8. The method of claim 1, wherein the first announcement item and the second announcement item are received by the telephone over a wireless network.

9. A method for delivering an announcement item to a telephone, comprising:
   (a) sending a first announcement item by a server to the telephone, the first announcement item comprising a first item identity, a first item time information, and a first audio data; and
   (b) sending a second announcement item by the server to the telephone for updating the first announcement item at the telephone, the second announcement item comprising a second item identity, a second item time information, and a second audio data, wherein the second item identity matches the first item identity, wherein the second audio data is different from the first audio data, wherein the updating comprises updating the first item time information with the second item time information and updating the first audio data with the second audio data.

10. The method of claim 9, wherein the first announcement item or the second announcement item comprises one or more of the following:
    a piece of news;
    an advertisement;
    a sports report;
    a traffic report;
    a weather report; or
    an event reminder.

11. The method of claim 9, wherein the sending (a) and the sending (b) further comprise:
    (a1) sending a package comprising a package update time and the first announcement item by the server to the telephone, wherein the telephone connects to a timer and sets the timer based on the package update time; and
    (b1) sending the second announcement item by the server to the telephone when the timer expires.

12. A system, comprising:
    a telephone, wherein the telephone:
      receives a first announcement item, the first announcement item comprising a first item identity, a first item time information, and a first audio data;
      receives a second announcement item, the second announcement item comprising a second item identity, a second item time information, and a second audio data;
      determines if the second item identity matches the first item identity; and
      in response to determining that the second item identity matches the first item identity, updates the first announcement item, the update comprising:
        updates the first item time information with the second item time information; and
        updates the first audio data with the second audio data.

13. The system of claim 12, wherein the first announcement item or the second announcement item comprises one or more of the following:
    a piece of news;
    an advertisement;
    a sports report;
    a traffic report;
    a weather report; or
    an event reminder.

14. The system of claim 12, wherein the update further comprises:
    in response to determining that the second item identity does not match the first item identity, adds a new announcement item comprising the second item identity, the second item time information, and the second audio data.

15. The system of claim 14, wherein the telephone further:
    sends the first audio data of the first announcement item and the second audio data of the new announcement item to an audio player.

16. The system of claim 15, wherein in sending the first audio data and the second audio data, the telephone further:
    determines an order for the first audio data and the second audio data; and
    sends the first audio data and the second audio data to the audio player according to the order.

17. The system of claim 16, wherein in determining the order, the telephone further:
    determines the order based on the first item time information and the second item time information.

18. The system of claim 16, wherein the first announcement item further comprises a first item priority and the second announcement item further comprises a second item priority, wherein in determining the order, the telephone further:
    determines the order based on the first item priority and the second item priority.

19. The system of claim 12, further comprising a wireless network, wherein the first announcement and the second announcement item are received by the telephone over the wireless network.

20. A computer program product comprising a computer useable medium having a computer readable program, wherein the computer readable program when executed on a computer causes the computer to:
   (a) receive a first announcement item, the first announcement item comprising a first item identity, a first item time information, and a first audio data;
   (b) receive a second announcement item, the second announcement item comprising a second item identity, a second item time information, and a second audio data;
   (c) determine if the second item identity matches the first item identity; and
   (d) in response to determining that the second item identity matches the first item identity, update the first announcement item, the update comprising:
      (d1) update the first item time information with the second item time information; and
      (d2) update the first audio data with the second audio data.

21. The computer program product of claim 20, wherein the update (d) further comprises:
   (d3) in response to determining that the second item identity does not match the first item identity, add a new announcement item comprising the second item identity, the second item time information, and the second audio data.

22. The computer program product of claim 21, further comprising:
   (e) send the first audio data of the first announcement item and the second audio data of the new announcement item to an audio player.

23. The computer program product of claim 22, wherein the send (e) comprises:
   (e1) determine an order for the first audio data and the second audio data; and
   (e2) send the first audio data and the second audio data to the audio player according to the order.

24. The computer program product of claim 23, wherein the determine (e1) comprises:
   (e1i) determine the order based on the first item time information and the second item time information.

25. The computer program product of claim 23, wherein the first announcement item further comprises a first item priority and the second announcement item further comprises a second item priority, wherein the determine (e1) comprises:
   (e1i) determine the order based on the first item priority and the second item priority.

26. A computer program product comprising a computer useable medium having a computer readable program, wherein the computer readable program when executed on a computer causes the computer to:
   (a) send a first announcement item to the telephone, the first announcement item comprising a first item identity, a first item time information, and a first audio data; and
   (b) send a second announcement item to the telephone for updating the first announcement item at the telephone, the second announcement item comprising a second item identity, a second item time information, and a second audio data, wherein the second item identity matches the first item identity, wherein the second audio data is different from the first audio data,
wherein the update comprises update the first item time information with the second item time information and update the first audio data with the second audio data.

\* \* \* \* \*